United States Patent [19]

Kyoto et al.

[11] Patent Number: 4,804,247
[45] Date of Patent: Feb. 14, 1989

[54] QUARTZ GLASS OPTICAL FIBER

[75] Inventors: Michihisa Kyoto; Shuzo Suzuki; Minoru Watanabe, all of Yokohama; Motohiro Nakahara, Mito, all of Japan

[73] Assignees: Sumitomo Electric Industries, Ltd., Osaka; Nippon Telegraph & Telephone Corporation, Tokyo, both of Japan

[21] Appl. No.: 719,952

[22] Filed: Apr. 4, 1985

[30] Foreign Application Priority Data

Apr. 12, 1984 [JP] Japan .................................. 59-71730

[51] Int. Cl.⁴ .......................... G02B 6/02; G02B 6/16; G02B 6/10; C03C 25/02
[52] U.S. Cl. .............................. 350/96.34; 350/96.29; 350/96.30; 350/96.31; 65/3.12; 65/DIG. 16
[58] Field of Search ............... 350/96.29, 96.30, 96.31, 350/96.34; 65/3.12, DIG. 16

[56] References Cited

U.S. PATENT DOCUMENTS

| | | | |
|---|---|---|---|
| 4,165,915 | 8/1979 | Rau et al. | 350/96.30 X |
| 4,328,318 | 5/1982 | Miranday et al. | 350/1.3 X |
| 4,367,918 | 1/1983 | Pinnow | 350/96.34 X |
| 4,402,720 | 9/1983 | Edahiro et al. | 350/96.34 X |
| 4,493,530 | 1/1985 | Kajioka et al. | 350/96.33 X |
| 4,557,561 | 12/1985 | Schneider et al. | 350/96.34 |

FOREIGN PATENT DOCUMENTS

| | | | |
|---|---|---|---|
| 1162948 | 2/1984 | Canada | 65/DIG. 16 |
| 51-127744 | 11/1976 | Japan . | |
| 53-46742 | 3/1978 | Japan . | |
| 60-141628 | 7/1985 | Japan . | |
| 60-141643 | 7/1985 | Japan . | |

OTHER PUBLICATIONS

"Progress in Optical Waveguide Process and Materials", by Schultz Applied Optics, vol. 18, No. 21/Nov. 1, 1979 pp. 3684–3693.
"Physics of Fiber Optics", by Schultz et al. p.-6, 1981.
The Bell System Technical Journal, vol. 61, No. 2, Feb. 1982, pp. 262–266.

Primary Examiner—William L. Sikes
Assistant Examiner—Akm E. Ullah
Attorney, Agent, or Firm—Cushman, Darby & Cushman

[57] ABSTRACT

A quartz optical fiber comprising a core having a higher refractive index and made of pure quartz containing fluorine and phosphorus pentoxide and a cladding having a lower refractive index, a weight ratio of fluorine and phosphorus pentoxide in the core being larger than 1 (one), which is substantially free from unstability of the glass structure.

6 Claims, 2 Drawing Sheets

Fig. 1(a) (PRIOR ART)
Fig. 1(b) (PRIOR ART)
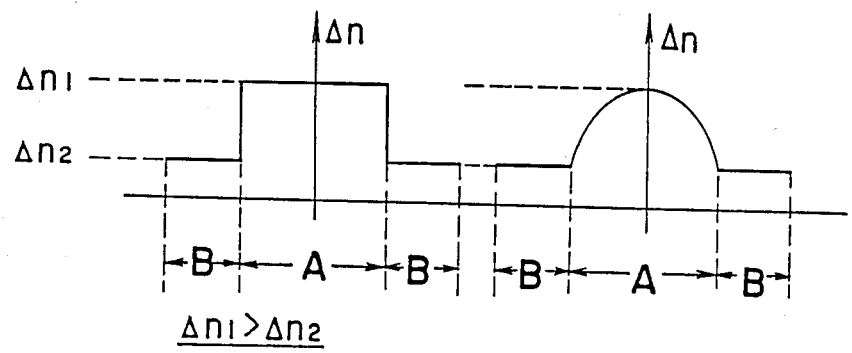
$\Delta n_1 > \Delta n_2$
Fig. 2 (PRIOR ART)
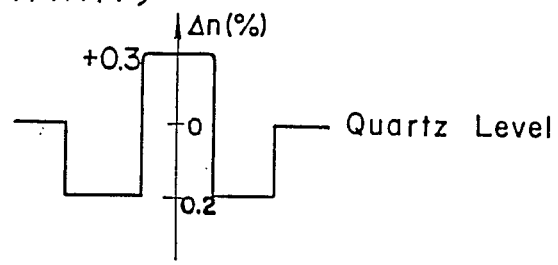
Fig. 3
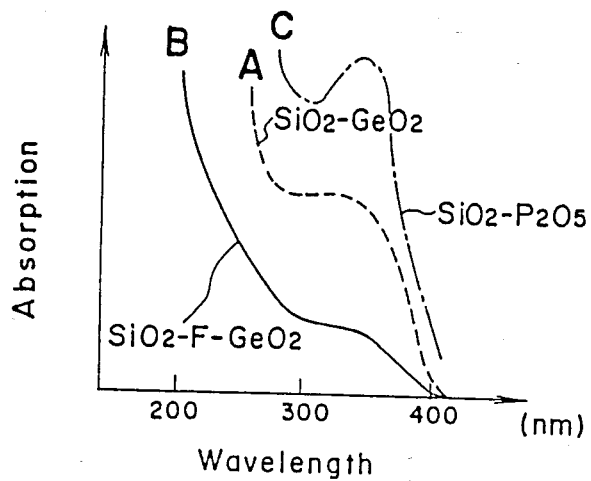

QUARTZ GLASS OPTICAL FIBER

FIELD OF THE INVENTION

The present invention relates to a quartz glass optical fiber. More particularly, it relates to a quartz glass optical fiber comprising a core made of pure quartz containing at least fluorine and phosphorus pentoxide ($P_2O_5$).

BACKGROUND OF THE INVENTION

A glass preform for use in the fabrication of an optical fiber comprises a core and a cladding surrounding the core. The core must have a higher refractive index than the cladding so as to allow easy propagation of light therethrough.

In order to increase the refractive index of the core higher than that of silica, additives such as $TiO_2$, $GeO_2$ and $Al_2O_3$ are usually added to the core material. Among them, $GeO_2$ is most commonly used (cf. Japanese Patent Kokai Publication (unexamined) Nos. 127744/1976 and 46742/1078). In a usual optical fiber, pure quartz glass is often used to form the cladding. In this case, pure quartz glass has a refractive index of 1.4585 and $\Delta n = 0$.

Referring to FIGS. 1A and 1B, there are shown diagrams illustrating distributions of the refractive index of two types of optical fibers. In these figures, the regions A and B indicate the core and cladding, respectively. The difference in refractive index between the core and cladding is usually indicated in terms of a relative refractive index difference (in percent). That is, assuming that the refractive indices of the core and cladding are $n_1$ and $n_2$, respectively, the relative refractive index difference $\Delta n$ % is represented by the following equation:

$$\Delta n \% = \frac{n_1 - n_2}{n_2} \times 100.$$

FIG. 1A shows the general distribution of refractive index of a single mode optical fiber. In this case, $\Delta n$ is usually 0.3 to 0.5%. FIG. 1B shows the general distribution of refractive index of a multi-mode optical fiber. For an optical fiber for ordinary communication purposes, n is usually about 1%, and for large aperture optical fibers used in computer ring communication applications, $n_{12}$ is usually about 2 to 4%.

Oxide additives such as $GeO_2$ added to increase refractive index of the core cause light scattering (Rayleigh scattering) because of their inherent characteristics. As the amount of the additive added is increased, the degree of light scattering (Rayleigh scattering) due to the additive increases. This is not desirable for light transmission.

If the additive is added in a large amount, bubbles and/or a crystal phase are formed in the glass preform. In the case of $GeO_2$, for example, GeO gas easily forms, thereby producing bubbles. In the case of $Al_2O_3$, clusters of $Al_2O_3$ crystals easily forms. This is not desirable for light transmission characteristics and also for the strength of the optical fiber. Furthermore, the coefficient of thermal expansion of glass increases, which makes the glass preform fragile. Therefore, also from the viewpoint of light propagation and glass strength, it is preferred to reduce the amount of the additive added to the core.

For this reason, it is proposed to increase the refractive index difference between the core and cladding by lowering the refractive index of the cladding. For example, additives which lower the refractive index, such as $B_2O_3$, fluorine or a combination thereof, can be added to the cladding (cf. Japanese Patent Kokai Publication (unexamined) No. 111259/1982). However, $B_2O_3$, has the disadvantage that the coefficient of thermal expansion of the resulting cladding greatly changes with the concentration of $B_2O_3$ and the refractive index changes upon heating. Furthermore, with regards to light transmission, the cladding has an absorption loss due to $B_2O_3$ in a longer wavelength region. Thus, it is preferred to use fluorine as a refractive index-lowering agent.

The addition of fluorine to quartz glass produces optical fibers with various refractive index distributions, and with the proper choice of structure, an optical fiber of low dispersion over a wide wavelength region can be obtained.

An advantage obtained by using fluorine as an additive is that, since the refractive index of the cladding can be made lower than that of pure quartz, pure quartz or quartz glass with a small amount of additive added thereto can be used in the fabrication of the core.

In addition, $GeO_2$ as an additive to increase the refractive index and fluorine as an additive to decrease the refractive index may be simultaneously added to the core and the cladding, respectively.

An optical fiber having a distribution of refractive index shown in FIG. 2 has been proposed (cf. A. D. Pearson, et al., Fabrication and Properties of Single Mode Optical Fiber Exhibiting Low Dispersion, Low Loss, and Tight Mode Confinement Simultaneously, The Bell System Technical L., Vol. 61, No. 2 (1982) 262) and the new optical fiber comprises a core made of $GeO_2$—$SiO_2$ glass and a cladding made of $SiO_2$—F—$P_2O_5$ produced by MCVD (Modified chemical vapor-phase deposition) method.

However, the structural instability of the optical fiber comprising the core made of $GeO_2$—$SiO_2$ glass was revealed by UV absorption peak and coloring by radiation observed therein. Needless to say, the structural deficiency of the glass structure adversely affects light transmission characteristics even in the near infrared region in which the optical fiber is used.

SUMMARY OF THE INVENTION

One object of the invention is to provide a quartz optical fiber substantially free from instability of the glass structure.

Another object of the invention is to provide a quartz optical fiber comprising a core containing fluorine and phosphorus pentoxide.

Accordingly, the present invention provides a quartz optical fiber comprising a core having a higher refractive index and made of pure quartz containing fluorine and phosphorus pentoxide and a cladding having a lower refractive index, a weight ratio of fluorine and phosphorus pentoxide in the core being greater than 1 (one).

BRIEF DESCRIPTION OF THE DRAWINGS

FIG. 1A shows the general distributions of the refractive index for a single-mode optical fiber.

FIG. 1B shows the general distribution of the refractive index for a multimode optical fiber.

FIG. 2 shows the distribution of the refractive index for an optical fiber comprising a core of $GeO_2$—$SiO_2$ glass and a cladding of $SiO_2$—F—$P_2O_5$.

FIG. 3 shows the UV absorption spectra of $SiO_2$—$GeO_2$ glass (Curve A), $SiO_2$—F—$GeO_2$ glass (Curve B), $SiO_2$—$P_2O_5$ glass (Curve C).

FIG. 4 illustrates a method for producing a soot preform consisting of a quartz fine particle mass by flame hydrolysis.

DETAILED DESCRIPTION OF THE INVENTION

Figures 4A, 4B:
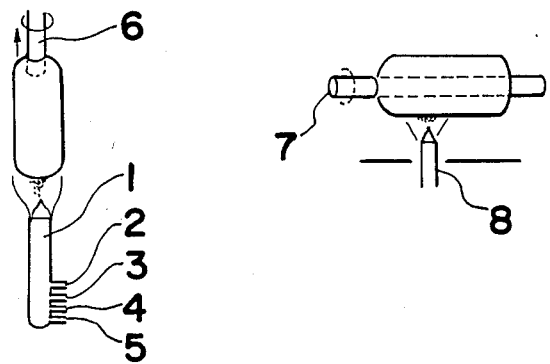
FIG. 4B illustrates a method for producing a pipe-like fine glass particle mass where the fine glass particle mass is deposited around a rotating quartz bar or carbon bar.

FIG. 3 shows UV absorption spectra of $SiO_2$—$GeO_2$ glass (Curve A), $SiO_2$—F—$GeO_2$ glass (Curve B) and $SiO_2$—$P_2O_5$ glass (Curve C). It is apparent from this figure that the fluorine-added glass shows lower absorption, and therefore includes less structural deficiency.

A tendency towards the generation of the structural deficiency in the glass influences resistance of the glass, which may be improved by the addition of fluorine.

However, the mechanism for the improvement in the structural stability by the addition of fluorine has not been thoroughly ascertained. Probably, an oxide such as $SiO_2$ and $GeO_2$ tends to have a structure $MO_x$ wherein x is less than 2 in the glass, and oxygen may be replaced with fluorine anion.

The deficiency in the glass can be reduced by the addition of fluorine, but cannot be eliminated because it is necessary to heat the glass at a temperature of 1,600° to 1,800° C. for the fabrication of an optical fiber and the bonds in the glass, for example, Si—O—Si bondings are easily broken at a higher temperatures. Si—O vibrations become vigorous at higher temperature so that these bonds are broken, and corresponds to the transition from a solid phase to a liquid phase. Therefore, it is preferred to fabricate the optical fiber at as low a temperature as possible. To accomplish this, phosphorus pentoxide is preferably added to lower the temperature at which the glass is made transparent and thereby reduces the structural deficiency.

The addition of phosphorus pentoxide is, however, not necessary to improve the light transmission characteristics of the optical fiber, and not optically desirable since phosphorus having a coordination number of 5 is unstable in the glass structure, that tends to have a structure having a coordination number of 4, which results in the structural deficiency. This is affirmed by an experiment showing that the glass with phosphorus pentoxide has a greater structural deficiency.

Phosphorus pentoxide can lower the fabrication temperature of the optical fiber so as to reduce the structural deficiency, but on the other hand, can increase the structural deficiency of the glass having coordination number of 4 of quartz since the coordination number of phosphorus atom is 5. Therefore, it is not possible to predict whether the addition of phosphorus pentoxide to the glass containing fluorine increases or decreases the structural deficiency of the glass.

It has now been found that the addition of phosphorus pentoxide to the glass containing fluorine suppresses generation of the structural deficiency, and further the weight ratio of fluorine to phosphorus pentoxide plays an important role to suppress the generation of the structural deficiency. The amount of fluorine should be greater than that of phosphorus pentoxide since when the amount of phosphorus pentoxide is greater than that of fluorine, the generation of the structural deficiency interferes with the stabilization of the glass structure by the addition of fluorine.

Preferably, the core of the optical fiber of the invention contains not larger than 3% by weight of fluorine and less than 3% by weight, more preferably less than 1% by weight of phosphorus pentoxide.

The core of the optical fiber according to the present invention may contain $GeO_2$ in an amount of not greater than 17% by weight.

Production of Soot Preform

In producing a soot preform consisting of a quartz glass fine particle mass by flame hydrolysis, as indicated in FIG. 4A, oxygen 2, hydrogen 3, a starting material gas 5, namely $SiCl_4$, $POCl_3$ or a gaseous mixture of $SiCl_4$, $POCl_3$, $GeCl_4$, $AlCl_3$, $SF_6$, and the like, are introduced into an oxyhydrogen flame with Ar or He gas as a carrier gas by means of a coaxial multi-tube burner 1 made of quartz. In FIG. 4A, numeral 4 indicates Ar gas which is introduced as a barrier gas so that the starting material gas reacts in a space several millimeters apart from the top of the burner 1. In order to produce a fine glass particle rod, the fine glass particle mass is deposited in the axial direction from the top of rotating seed member 6. To produce a pipe-like fine glass particle mass, as shown in FIG. 4B, a fine glass particle mass is deposited around a rotating quartz bar or carbon bar 7 while horizontally travelling a burner 8 and, thereafter, the bar 7 is removed. The bar 7 may be a glass preform for the core. In this case the bar need not be removed. A plurality of burners 8 may be used. The conditions for depositing the fine quartz particles on the seed member are substantially the same as in the conventional method.

The same soot preform as produced by the method of FIGS. 4A and 4B can be produced by hydrolysis of alcoholate. This method is referred to as a "sol-gel method".

Sintering of Soot Preform

The above produced soot preform is placed in a muffle tube made of pure quartz. It is heated to a temperature from 1,200° to 1,600° C., particularly to 1,400° C. at a temperature-raising rate of 2° to 10° C./min in an inert gas atmosphere.

When fluorine is added to the glass preform, a gaseous fluorine-containing compound (e.g. $SF_6$, $CF_4$, $C_2F_6$, $C_3F_8$, $CCl_2F_2$, $COF_2$, etc.) is added to the inert gas. Fluorine liberated from the fluorine-containing compound is added to the glass according to, for example, the following equation:

$$SiO_2(s) + \tfrac{1}{2}F_2(g) \rightarrow SiO_{1.5}F(S) + \tfrac{1}{4}O_2(S) \qquad (1)$$

wherein (s) and (g) indicate solid and gas states, respectively.

For dehydration, the inert gas atmosphere may contain a chlorine-containing compound (e.g. $Cl_2$, $SOCl_2$, $COCl_2$, $CCl_4$, etc.).

The glass preform may be prepared by other conventional methods, for example the MCVD method.

The thus produced transparent glass preform is drawn to fabricate an optical fiber in a muffle tube made of quartz by a per se conventional method.

The degree of the structural deficiency of the glass fiber is expressed in terms of the increased content of hydroxyl groups after heating the optical fiber in an atmosphere containing hydrogen at 200° C. for 24 hours. The increase of the content of the hydroxyl groups is apparently due to the increase of the structural deficiency (cf. J. E. Shelby, et al, "Radiation-included Isotope Exchange in Vitreous Silica" J. Appl. Phys., 50 (8) (1979) 5533).

The present invention is described in greater detail with reference to the following Examples.

EXAMPLE 1

A soot preform of $SiO_2$ containing $GeO_2$ and phosphorus pentoxide and having a diameter of 60 mm and a length of 300 mm was produced by the method as shown in FIG. 1A and heated in a stream of helium at a rate of 10 liters/min. including chlorine at a rate of 50 ml/min and $SF_6$ at a rate of 100 ml/min. at 1,300° C. to obtain a transparent glass preform containing 17% by weight of $GeO_2$, 0.5% by weight of phosphorus pentoxide and 2% by weight of fluorine. The thus produced glass preform was drawn to form a rod having a diameter of 10 mm, which is jacketed with quartz having an outer diameter of 26 mm and a thickness of 6 mm and further drawn to fabricate an optical fiber having a diameter of 125 micrometers.

The content of hydroxyl groups in the glass preform was 0.02 ppm, namely, attenuation of 1 dB/km at a wavelength of 1.38 micron.

COMPARATIVE EXAMPLE 1

A soot preform prepared in the same manner as in EXAMPLE 1 was heated in a stream of helium at a rate of 10 liters/min. including chlorine at a rate of 50 ml/min at a temperature higher than 1,600° C. to obtain a transparent glass preform containing 17% by weight of $GeO_2$ and 0.5% by weight of phosphorus pentoxide. The thus produced glass preform was drawn, jacketed with quartz and again drawn in the same manner as in EXAMPLE 1 to fabricate an optical fiber having a diameter of 125 micrometers.

The content of hydroxyl groups in the glass preform was 0.02 ppm, namely, attenuation of 1 dB/km at a wavelength of 1.38 micron.

COMPARATIVE EXAMPLE 2

A soot preform prepared in the same manner as in EXAMPLE 1 but not adding phosphorus pentoxide was heated to obtain a transparent glass preform containing 17% by weight of $GeO_2$ and 2% by weight of fluorine. An optical fiber fabricated from the glass fiber contained the hydroxyl groups of 0.02 ppm, namely, attenuation of 1 dB/km at a wavelength of 1.38 micron.

COMPARATIVE EXAMPLE 3

In the same manner as in COMPARATIVE EXAMPLE 1, a soot preform was produced. The produced soot preform was heated and fabricated in the same manner as in EXAMPLE 1 to fabricate an optical fiber containing 17% by weight of $GeO_2$. The content of hydroxyl groups in the optical fiber was 0.02 ppm.

EXAMPLE 2

A soot preform produced in the same manner as in EXAMPLE 1 was heated in a stream of helium at a rate of 10 liters/min. including $SF_6$ at a rate of 20 ml/min. at 1,400° C. to obtain transparent glass preform containing 17% by weight of $GeO_2$, 0.5% by weight of phosphorus pentoxide and 0.5% by weight of fluorine. The glass preform was drawn in the same manner as in EXAMPLE 1 to fabricate an optical fiber.

EXAMPLE 3

In the same manner as in EXAMPLE 1, a transparent glass preform containing 17% by weight of $GeO_2$, 1 % by weight of phosphorus pentoxide and 0.5% by weight of fluorine was produced and drawn to fabricate an optical fiber.

EXPERIMENT

In order to find structural deficiency in the optical fibers produced in EXAMPLE 1 and COMPARATIVE EXAMPLES 1, 2 and 3, following experiment was carried out.

Each optical fiber was covered with a first covering of silicone resin and a second covering of Nylon. The 500 m long optical fiber in a bundle form was heated in a furnace at 200° C. for a predetermined period of time. Then attenuation of light transmission at a wavelength of 1.38 micron was measured. The amount of fluorine added to the core was 0.05% in terms of $\Delta n$. The jacket tube was made of natural quartz for all the optical fiber.

TABLE

Figure 5:
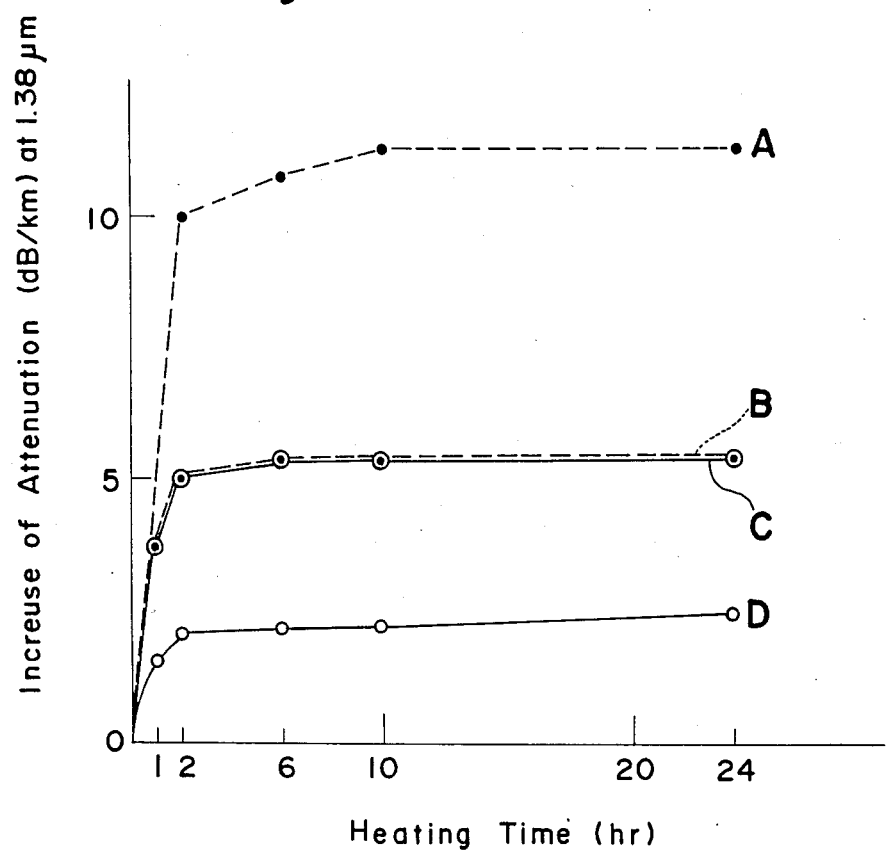
FIG. 5 shows the UV absorption spectra where an increase in the attenuation of light transmission is due to the presence of hydroxyl groups.

|  | Curve in FIG. 5 | Phosphorus pentoxide | Fluorine |
| --- | --- | --- | --- |
| Comp. Ex. 1 | A | Yes | No |
| Comp. Ex. 3 | B | No | No |
| Comp. Ex. 2 | C | No | Yes |
| Example 1 | D | Yes | Yes |

Increase in the attenuation of light transmission due to the hydroxyl groups was shown in the graph of FIG. 5, in which the ordinate and the abscissa correspond to the increase of the attenuation of light transmission at a wavelength of 1.38 micrometer and the heating time, respectively.

From these results, it is understood that the attenuation of light transmission can be reduced from about 10 dB/km to about 5 dB/km by the addition of fluorine or removal of phosphorus petoxide. Co-addition of fluorine and phosphorus pentoxide further decrease the attenuation of light transmission from about 5 dB/km to about 3 dB/km.

The reason why the addition of fluorine to the core reduces the attenuation of the light transmission may be that the fluorine is bonded to the structural deficiency due to the "generation of hydroxy groups" in the glass.

The reason why the co-addition of fluorine and phosphorus pentoxide further reduces the attenuation of light transmission may be that the lowering of the sintering temperature by the addition of the phosphorus pentoxide suppresses the thermal generation of the structural deficiency, which overwhelms the increase of the structural deficiency caused by the addition of phosphorus pentoxide.

The optical fiber produced in EXAMPLE 2 had substantially the same result as in EXAMPLE 1, that is, the increase of the attenuation of light transmission had tendency like the curve D in FIG. 5.

The optical fiber produced in EXAMPLE 3 had substantially the same result as in COMPARATIVE EXAMPLE 2, that is, the increase of the attenuation of light transmission had tendency like the curve A in FIG. 5. This means that the amount of phosphorus pentoxide should be smaller than that of fluorine.

What is claimed is:

1. A quartz optical fiber comprising a core having a higher refractive index and made of pure quartz containing fluorine and phosphorus pentoxide and a cladding having a lower refractive index, a weight ratio of fluorine and phosphorus pentoxide in the core being larger than 1 (one).

2. A quartz optical fiber according to claim 1, wherein the amount of fluorine is not larger than 3% by weight.

3. A quartz optical fiber according to claim 1, wherein the amount of phosphorus pentoxide is less than 3% by weight.

4. A quartz optical fiber according to claim 3, wherein the amount of phosphorus pentoxide is less than 1.0% by weight.

5. A quartz optical fiber according to claim 1, wherein the core contains $GeO_2$.

6. A quartz optical fiber according to claim 5, wherein the amount of the $GeO_2$ is not larger than 17% by weight.

* * * * *